United States Patent [19]
Detable et al.

[11] Patent Number: 5,536,047
[45] Date of Patent: Jul. 16, 1996

[54] QUICK CONNECTION FOR FITTING A RIGID TUBE IN A CONNECTOR

[75] Inventors: Pascal Detable, Gievres; Michel Andre, Romorantin Lanthenay, both of France

[73] Assignee: Etablissments Caillau, France

[21] Appl. No.: 296,124

[22] Filed: Aug. 25, 1994

[30] Foreign Application Priority Data

Oct. 1, 1993 [FR] France .................................. 93 11706

[51] Int. Cl.$^6$ .................................................. F16L 35/00
[52] U.S. Cl. ............................ 285/39; 285/93; 285/308; 285/319; 285/321; 285/921; 285/906
[58] Field of Search ................................... 285/321, 319, 285/93, 39, 308, 906, 921

[56] References Cited

U.S. PATENT DOCUMENTS

| | | | |
|---|---|---|---|
| 3,315,990 | 4/1967 | Kramer | 285/321 X |
| 4,401,326 | 8/1983 | Blair | 285/321 X |
| 4,423,892 | 1/1984 | Bartholomew | 285/321 X |
| 4,541,657 | 9/1985 | Smyth | 285/308 X |
| 4,884,829 | 12/1989 | Funk et al. | 285/321 X |
| 5,226,679 | 7/1993 | Klinger | 285/93 |
| 5,228,728 | 7/1993 | McNaughton et al. | 285/93 X |

FOREIGN PATENT DOCUMENTS

| | | |
|---|---|---|
| 0511891 | 4/1992 | European Pat. Off. . |
| 3815168 | 9/1989 | Germany . |
| 3815170 | 9/1989 | Germany . |

*Primary Examiner*—Dave W. Arola
*Attorney, Agent, or Firm*—Marshall & Melhorn

[57] ABSTRACT

This invention relates to a connector of a quick connection allowing tight connection of a rigid tube provided, at some distance from its free end intended to be fitted in the inlet of the connector, with a bead projecting radially with respect to the outer surface of the tube and presenting a substantially radial side opposite said end. The connector presents a first inner housing comprising an O-ring capable of coming into contact with the outer surface of the tube between its free end and its bead and a second inner housing to receive a locking ring elastically deformable in the radial direction. The locking ring is formed by a thin metal band presenting a generally oblong profile, the central region of said ring being constituted by substantially cylindrical portions whose diameter in the free state is at the most equal to the diameter of the tube. The zone located at one end of the large diameter of the oblong profile is constituted by a bridge in the form of an upturned U whose base essentially forms a part radially projecting outside the body of the connector.

12 Claims, 8 Drawing Sheets

QUICK CONNECTION FOR FITTING A RIGID TUBE IN A CONNECTOR

FIELD OF THE INVENTION

The present invention relates to a quack connection for fitting a rigid tube in a connector.

BACKGROUND OF THE INVENTION

Patents FR-A-2 576 771, 2 614 084, 2 617 943 and EP-A-440 564, 511 891, 605 801 and French Patent Application 93/05558, in particular, already disclose various types of quick connection of a rigid tube fitted in a connector to be locked axially thereon and to ensure, in addition, a tight connection of two pipes conveying fluids, sometimes at high temperature. The connector of such a quick connection, much used in mass production, particularly in the automobile industry, essentially comprises, from the inlet of the connector for the tube:

- a locking ring, elastically deformable in the radial direction and disposed in a housing in the connector, capable of constituting an axial stop for a bead projecting radially with respect to the outer surface of the tube,
- a seal device, generally at least an O-ring, likewise disposed in a housing in the connector and capable of being in contact with the outer surface of the rigid tube after fitting thereof.

This type of connection allows automatic locking of the tube during fitting thereof in the connector, the locking ring being elastically deformed in the radial sense during passage of the bead of the tube. However, a special zone of the locking ring projects radially outside the connector, through an opening made in the wall thereof so that a pressure on this special zone makes it possible to deform the ring radially again to allow dismantling of the connection.

Generally, the shape of the sides of the bead of the tube is not imposed by the users but certain users require, more and more, both for reasons of safety and to facilitate interchangeability, that the side of the bead serving as bearing face for the locking ring be located in a substantially radial plane with respect to the axis of the tube. This first requirement imposes various servitudes, which have become usual, in the design and production of the connection.

Furthermore, the users formulate other requirements, which are sometimes contradictory, for certain applications.

For example, it is frequently desired that, when the connection is first assembled, an indicator of correct locking thereof, possibly detachable from the connector, allow an easy control. However, it is at the same time desired that a visible indicator of correct locking also be provided, allowing control again after the connection has been dismantled.

Similarly, it is frequently desired that dismantling be able to be effected manually, preferably without any tool or, on the contrary, it is required that such dismantling be possible only by means of a specific tool, which prevents any person not having such a tool from dismantling it.

Applicants have therefore sought to improve the known structure of the connector of a quick connection satisfying the usual servitudes in the case of connection of a tube whose bead presents a radial side for the abutment of the locking ring, so that this connector is capable of receiving, without substantial modification, complementary elements appropriate for performing all or part of the supplementary functions required by the users, even if certain of them appear a priori contradictory or incompatible on the same connection.

SUMMARY OF THE INVENTION

The invention therefore relates to a quick connection for the tight connection of a rigid tube in a connector, said tube being provided, at some distance from its free end intended to be fitted in the connector, with a bead projecting radially with respect to the outer surface of the tube and presenting a substantially radial side opposite said end. The connector presents a first inner housing for receiving an O-ring capable of coming into contact with the outer surface of the tube between its free end and the bead. A second inner housing is also provided in the connector to receive a locking ring. This latter, of oblong shape, and elastically deformable in the radial sense, presents diametrally opposite, substantially cylindrical portions whose diameter, in the free state, is at the most equal to the diameter of the tube and which are capable of constituting a stop for the radial side of the bead of the tube. The ring comprises, on the other hand, at least one zone projecting radially on the outer surface of the connector through an opening made therein, said zone being located at one end of the large diameter of the oblong profile.

According to the invention, the locking ring is formed by a thin metal band, and its zone projecting radially outside the connector is constituted by a bridge in the form of an upturned U whose base essentially forms the part radially projecting outside the connector.

Thanks to this structure, and more particularly to that of the locking ring, the connector of the quick connection may comprise only a limited number of elements made of thin metal, generally stamped and crimped on one another. The radial dimensions of the connection are consequently limited, which is particularly appreciated by the users if the connection of the pipes must be effected in encumbered zones. Moreover, as the essential elements of the connection are metallic, they will not be very sensitive to the variations in temperature and the operating performance of the connection will generally be improved with respect to similar connections. Finally, as will be seen hereinbelow, the basic structure of the connection according to the invention may be equipped, without great modifications, with complementary members performing secondary functions required by the users for certain applications of the connection.

BRIEF DESCRIPTION OF THE DRAWINGS

The invention will be more readily understood on reading the following description with reference to the accompanying drawings, in which.

3

Figure 2:
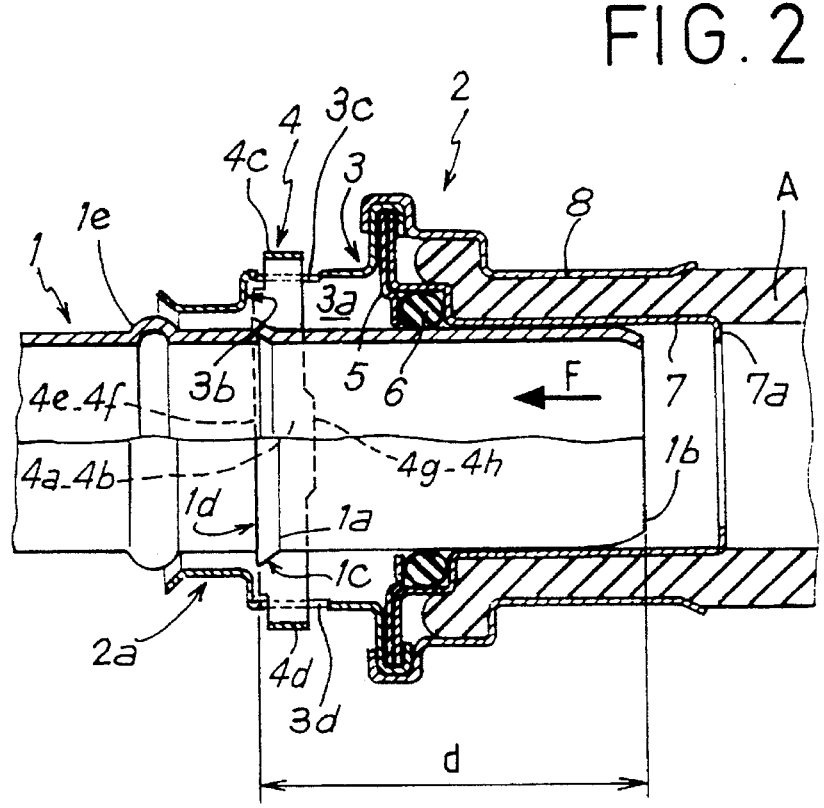
FIG. 2 is a view in axial section, with parts torn away, of a connection according to FIG. 1, before the tube is locked.
Figure 3:
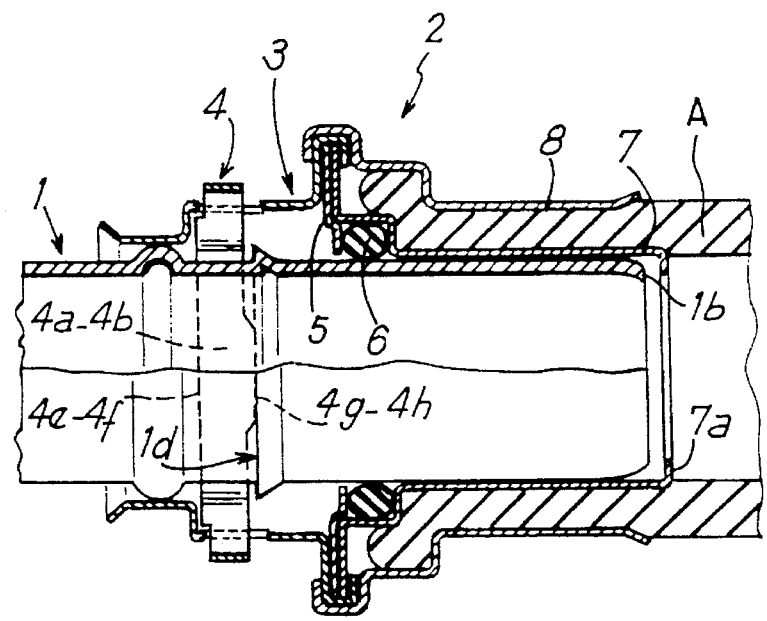
FIG. 3 is a view similar to FIG. 2, with parts torn away, after the tube has been locked.
Figure 8:
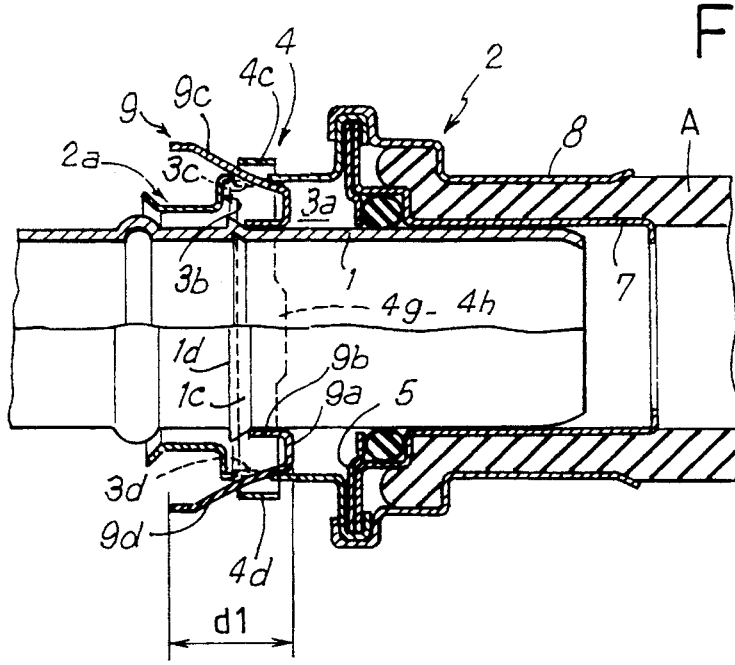
Figure 9:
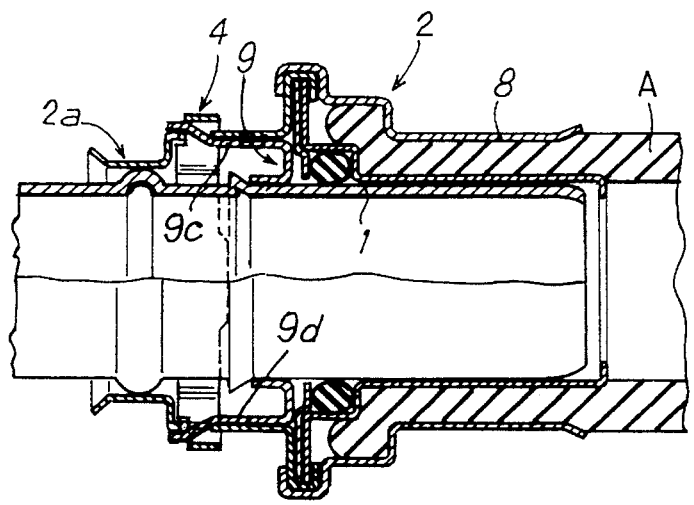

FIGS. 8 and 9 are views similar to FIGS. 2 and 3 in the case of an embodiment equipped with a permanent and sliding locking indicator.

Figure 10:
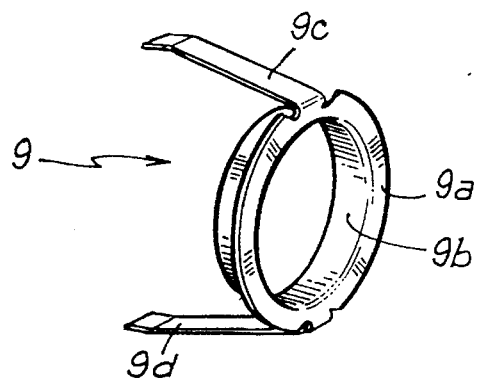

FIG. 10 is a view in perspective of the locking indicator of FIG. 8.

Figure 11:
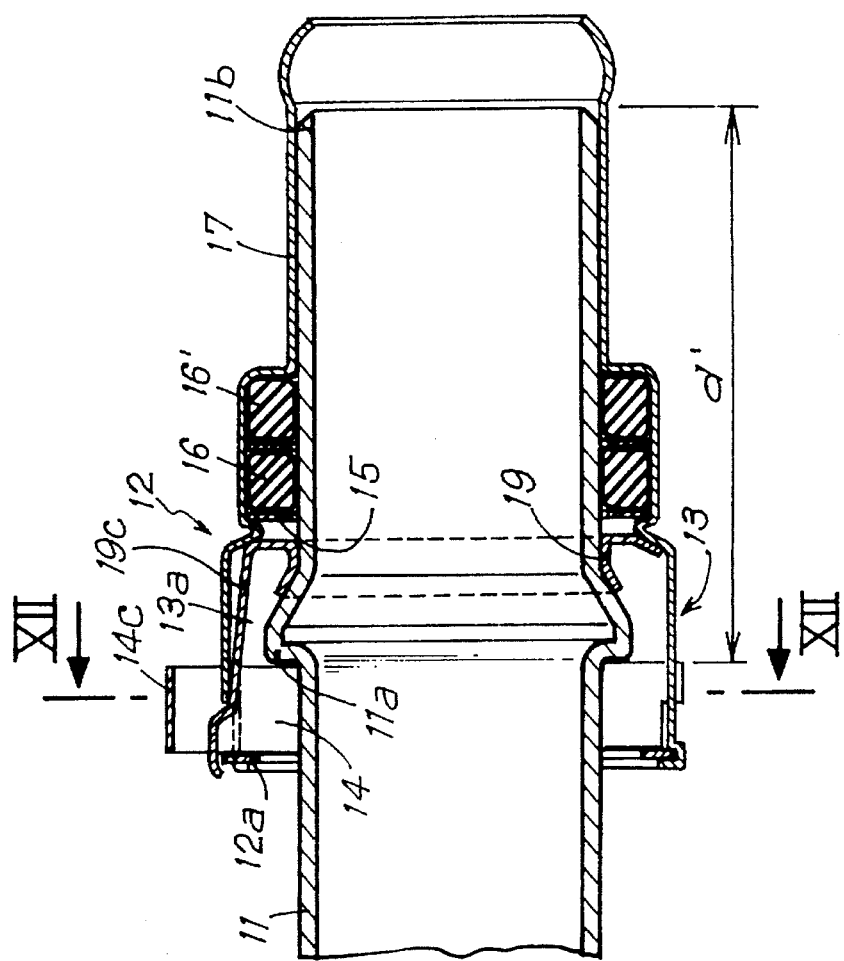

FIG. 11 is a view in section similar to FIG. 9, in the case of an embodiment of the basic structure of the connector.

Figure 12:
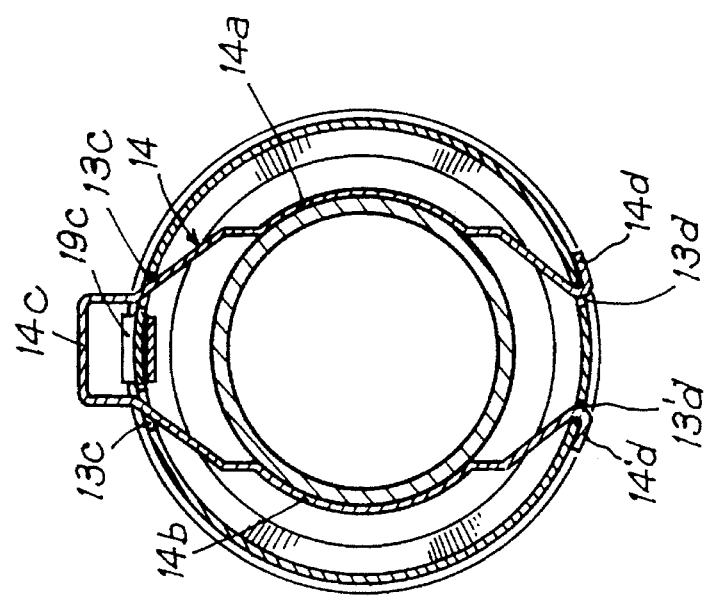

FIG. 12 is a section along XII—XII of FIG. 11.

Figure 13:
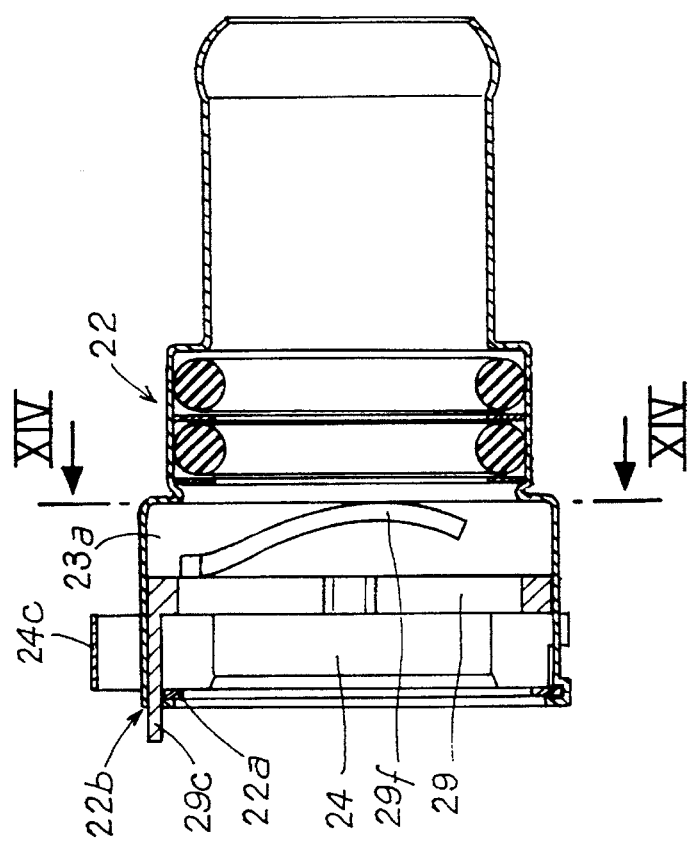

FIG. 13 is a view in section similar to FIGS. 9 and 11 in the case of a variant embodiment of the locking indicator, the tube being assumed to be extracted from the connector.

Figure 14:
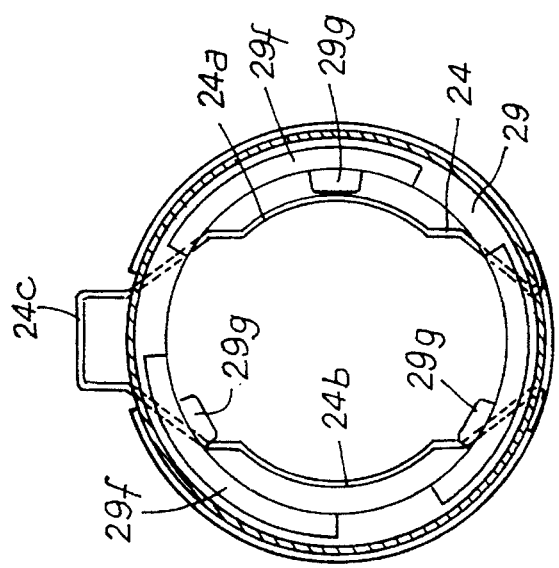

FIG. 14 is a section along XIV—XIV of FIG. 12.

Figure 15:
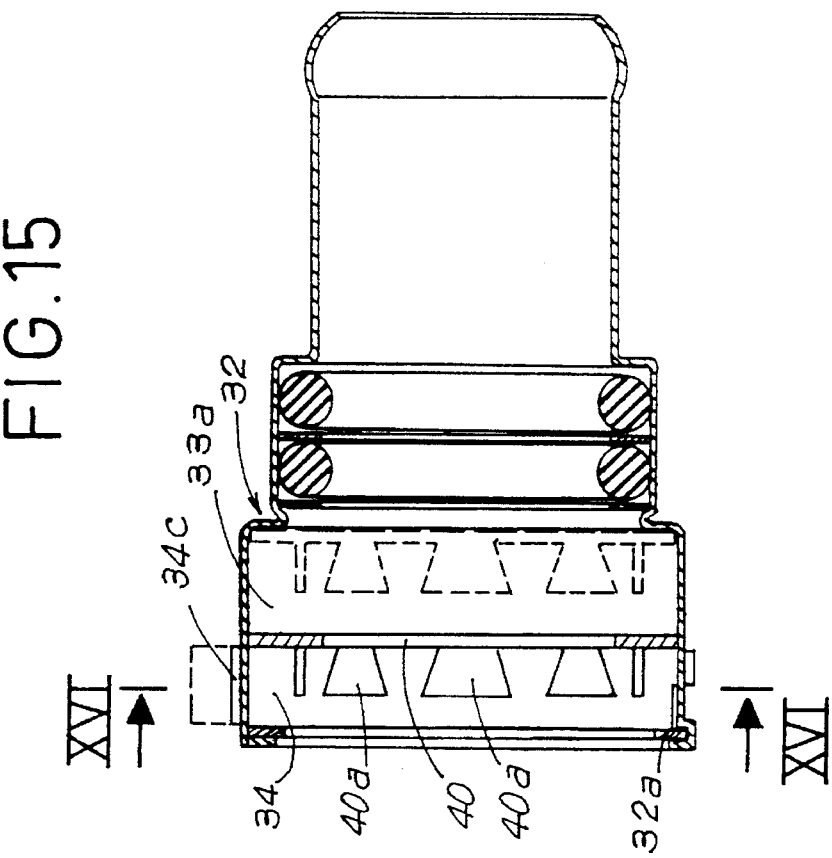

FIG. 15 is a view in section of a connector structure similar to that of FIG. 13, equipped with an instantaneous locking indicator.

Figure 16:
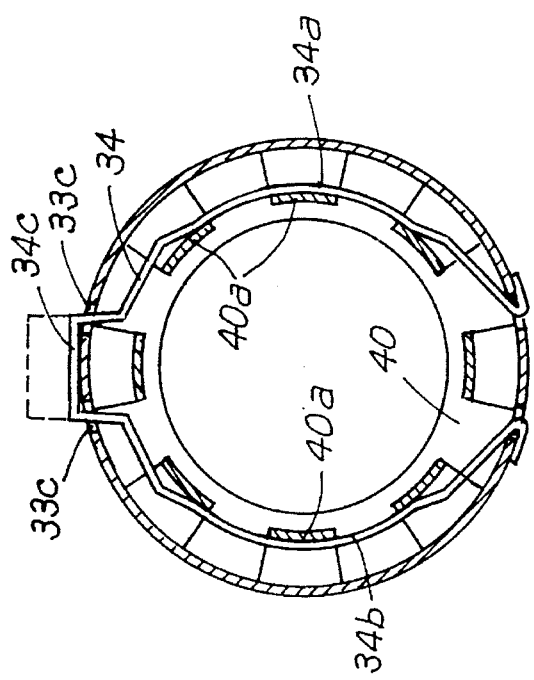

FIG. 16 is a section along XVI—XVI of FIG. 15.

Figure 4:
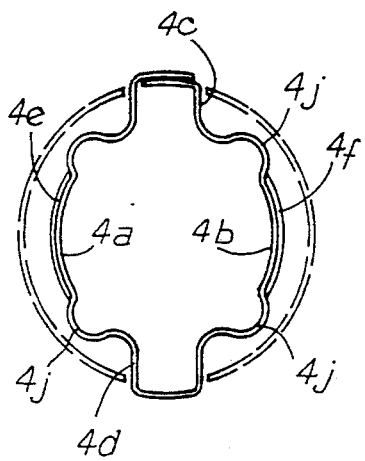
FIG. 4 is a front view of the locking ring, in the direction of arrow F of FIG. 2, showing, in addition, in broken lines and partially, the radial projection of certain zones 9f the ring outside the connector.
Figure 5:
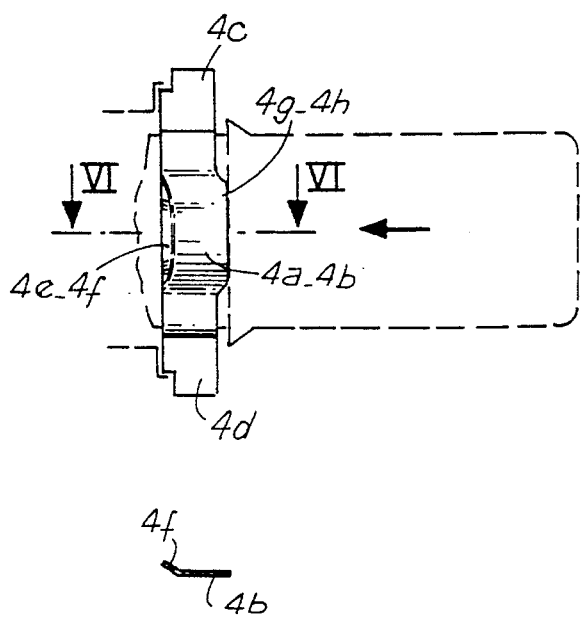
FIG. 5 is a side view of the ring of FIG. 4 showing in addition, in broken lines, the locking of the tube by the ring and the abutment of the latter on the connector.
Figure 17:
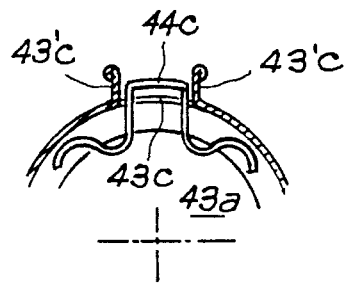
Figure 18:
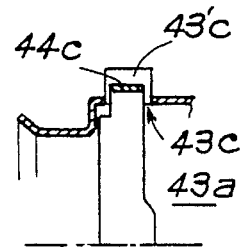

FIGS. 17 and 18 are partial views, similar to FIGS. 4 and 5, in the case of a variant embodiment.

Figure 19:
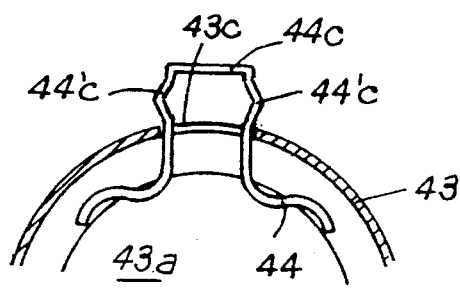

FIG. 19 is a partial view similar to FIG. 17 in the case of another variant embodiment.

Figure 20:
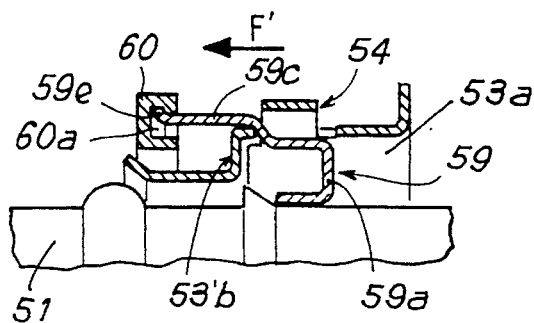
Figure 22:
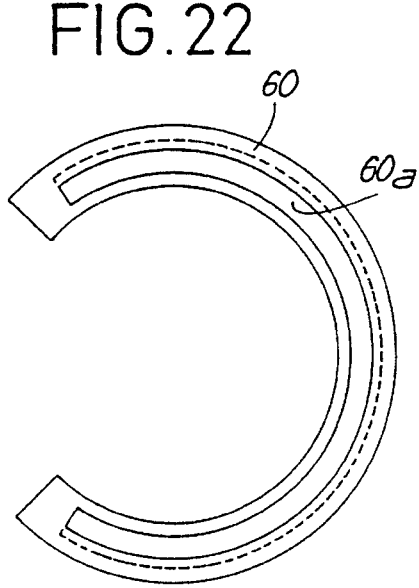

FIGS. 20 and 22 are partial views similar to FIGS. 8 and 9 in the case of a variant comprising, in addition, a detachable indicator.

FIG. 22 is a front view of the detachable indicator, in the direction of arrow F' of FIG. 20.

DESCRIPTION OF PREFERRED EMBODIMENTS

Figure 1:
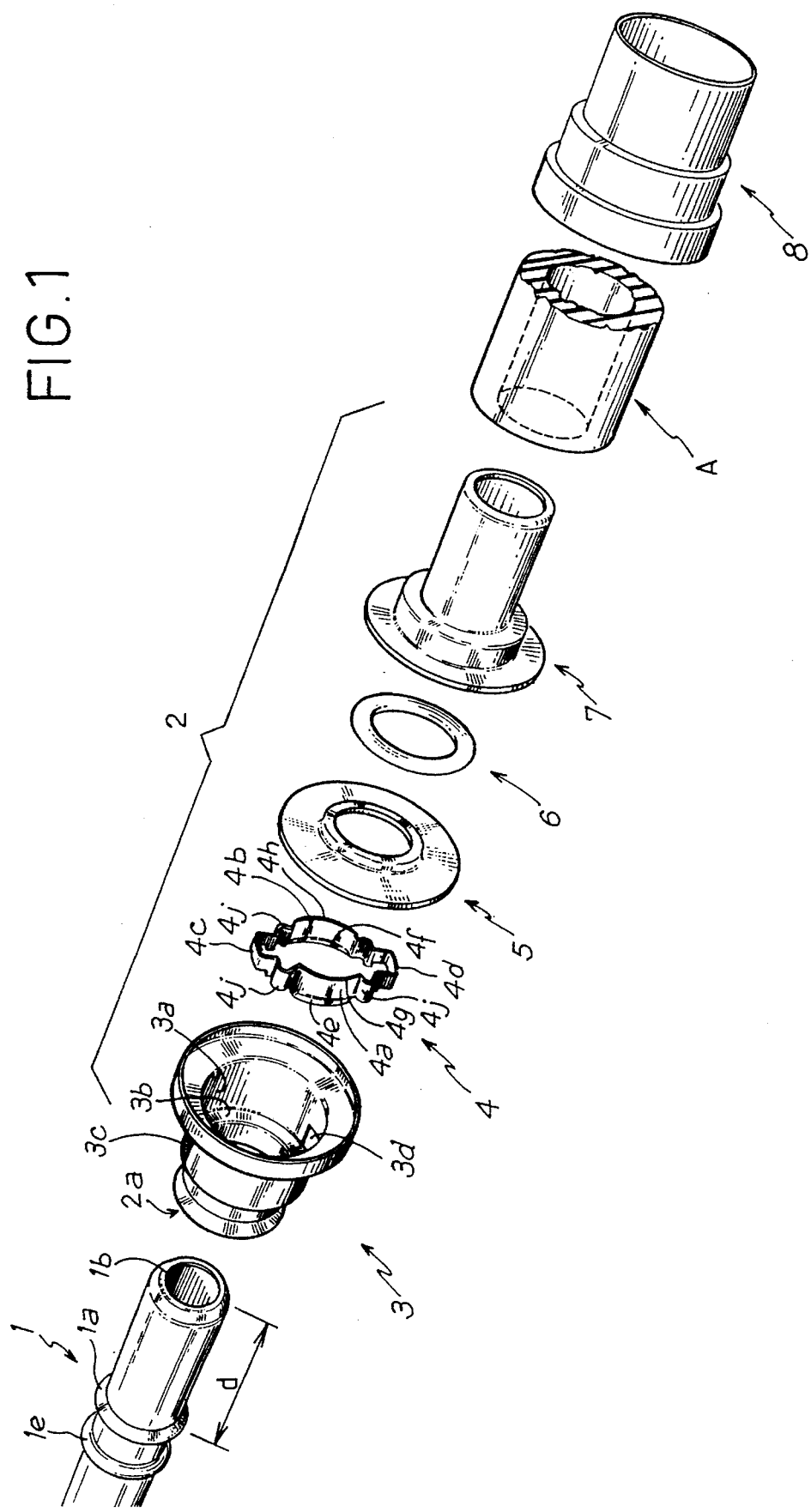
FIG. 1 is an exploded view in perspective of the various elements constituting a quick connection according to the invention, before the connector is assembled.

Referring now to the drawings, FIGS. 1, 2 and 3 firstly show a connection which comprises, on the one hand, a tube 1 made of rigid material, such as metal, or semi-rigid material such as a plastics material, on the other hand, a connector generally referenced 2; the rear part of the latter, located to the right in the Figures, is assembled in tight manner on a flexible pipe A, such as a radiator hose of rubber or similar material. The connector 2 is constituted by a body 3, a locking ring 4, an annular radial wall 5, an O-ring 6, a bush 7. An outer bush 8 is capable of tightening on the flexible hose A previously fitted on the bush 7. Elements 3, 5, 7 and 8 are preferably made of stamped metal.

As is known, particularly by European Patent 440 564, the bush 7 makes it possible to constitute a first annular housing, closed by the radial wall 5, for the O-ring 6, said bush and radial wall being assembled on the body 3 of the connector by crimping of their periphery. Moreover, after the flexible hose A has been fitted on the rear part of the bush 7, the outer bush 8 caps the free end of the hose and ensures fixation thereof by clamping; a crimping of the periphery of the outer bush 8 on that of the body 8 terminates formation of the connection.

The connector 2 presents a second annular housing designated by 3a and formed in the body 3. In this housing is disposed the locking ring 4 of which the front edges, located to the left in the Figures, may abut, at least in certain zones which will be specified hereinafter, on the inner radial face 3b of the housing, located towards the inlet of the body. This latter constitutes the inlet 2a of the connector 2 and is intended to receive the tube 1.

Tube 1 is cylindrical and presents a bead 1a, located at a distance d from its free end 1b and projecting radially on its outer surface. Bead 1a is constituted by a ramp 1c, towards the free end 1b but its side 1d opposite this end is substantially radial. It is known that this radial side is intended to serve as bearing face on the locking ring after tube 1 has been fitted in connector 2.

Tube 1 advantageously comprises a second projecting bead 1e, located slightly to the rear of the first with respect to the free end $1_b$, the outer diameter of this second bead being at least equal to the outer diameter of the radial side 1d of the first bead.

The free end 1b of the tube as well as the inlet 2a of the bead are preferably bevelled, the inner diameter of the inlet 2a being substantially equal to the outer diameter of the bead 1e, while the inner diameter of the bush 7 is substantially equal to the diameter of tube 1.

Figure 6:
FIG. 6 is a section along VI—VI of FIG. 5.

The locking ring 4, also clearly visible in FIGS. 4, 5 and 6, constitutes one of the important elements of the connection. It is formed by a thin metal band wound on itself and presenting, as is clearly seen in FIG. 4, a closed, generally oblong profile. The small diameter of this profile is, in the free state, substantially equal to the outer diameter of the tube and, in any case, less than that of the bead 1a.

In its central region, the ring 4 presents two cylindrical portions 4a and 4b, while, in the regions located at the ends of the large diameter of the profile, the band constituting the ring is shaped as bridges 4c and 4d in the form of an upturned U, the base of the U itself defining the end of the large diameter of the profile.

The front edges 4e and 4f of the cylindrical portions 4a and 4b, i.e. those located towards the inlet 2a of the connector, are widened, as clearly shown in FIG. 6. As will be seen hereinbelow, this arrangement is such as to facilitate fit of the tube in the connector. The outer diameter of the widened edges 4e–4f is preferably slightly smaller than the inner diameter of the inlet 2a of the connector. Furthermore, the rear edges 4g and 4h of the same cylindrical portions project axially with respect to the rest of the rear edge of the ring 4 (FIG. 5).

Figure 7:
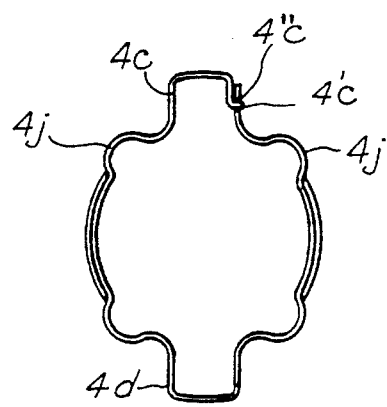
FIG. 7 is a view similar to FIG. 4, in the case of a variant embodiment.

The region of bridge 4c constitutes the zone of connection of the two ends of the band forming the ring. These two ends overlap, for example at the base of the U and are fixed to each other by any appropriate means, such as rivetting or spot welding (FIG. 4). However, for reasons which will be apparent hereinafter, it may be advantageous that the mechanical connection between the two ends of the band not be rigid, particularly in compression. FIG. 7 shows an articulated connection constituted by a simple fold 4'c of one of the ends of the band, this fold being simply engaged in a small opening 4"c made in the other end. In this way, the deformability of the ring is not affected by any local rigidification which might prove detrimental.

Between the cylindrical portions 4a–4b and bridges 4c–4d, the ring 4 advantageously presents ears 4j radially projecting with respect to the oblong profile of the ring. As shown in FIGS. 4 and 7, the ears 4j are preferably four in number, disposed symmetrically to one another with respect to the centre of the ring. By reason of the oblong shape of the ring and the radial projection of the ears, these Latter constitute an efficient zone of abutment of the front edge of the ring on the inner radial face 3b of the housing 3a without the front edges 4e and 4f of the cylindrical portions themselves being in contact with this inner face 3b.

It should be further indicated that, in the region of the housing 3a of the ring, the body 3 presents at least one opening whose dimensions are sufficient to cause part of the ring 4 projecting radially outside the body 3, to penetrate therein. As shown in FIGS. 1 to 3, two diametrally opposite openings 3c and 3d are preferably provided, whose shape corresponds substantially to that of the base of the bridges 4c and 4d. In this respect, it will be emphasized that the large diameter of the oblong profile of the ring is, in the free state of this latter, somewhat greater than the inner diameter of the housing 3. As is clearly seen in FIG. 2, when the ring 4 is placed in its housing 3a, the bridges 4c, 4d are, on the one hand, engaged in the openings 3c, 3d in which they are axially immobilized, with, however, all the clearances necessary for assembly and, on the other hand, project slightly by their base on the outer surface of the body 3.

As indicated hereinabove, there may exist only one opening 3c, the bridge 4d in that case being either eliminated, or in abutment on the inner cylindrical face of the housing 3a. This type of embodiment will be referred to again hereinbelow.

The locking ring is obviously disposed in the housing 3a of the body 3 before this latter is crimped on the outer periphery of the radial wall 5 and of the bush 7 under the conditions indicated above. It will be noted here that the bush 7 presents at its rear end a stop 7a and that the axial distance from this stop to the rear edges $4g-4_h$ of the cylindrical parts of the ring 4 is substantially equal to, but preferably slightly greater than the distance d previously defined.

The functioning of the connection according to the invention is no doubt already obvious to the man skilled in the art; however, the important points thereof will be emphasized with more particular reference to FIGS. 2 and 3.

The end 1b of tube 1 is engaged in inlet 2a of the connector and penetrates in bush 7; the outer surface of the tube comes firstly into contact with the O-ring 6 then with the inner surface of the bush. The tube continues to be fitted until the end 1b comes into abutment on the stop 7a of the bush.

During this movement, the ramp 1c of the bead 1a encounters the widened edges $4e-4_f$ of the cylindrical portions of the ring 4, which are thus somewhat deformed radially, in elastic manner. When the ramp 1c has passed beyond the rear edges 4g–4h of the ring, the latter retracts elastically and its cylindrical parts 4a–4b come into contact with the outer surface of the tube between the beads 1a and 1e, while said rear edges 4g–4h are capable of constituting an abutment for the side 1c of the bead. The tube is then locked axially in the connector since the ears 4j of the ring may abut on the inner face 3b of the housing of the ring in the body 3 (FIG. 3). However, it will be noted that the locking allows axial clearances to remain which are eliminated when a fluid under pressure is conveyed by the pipe on which the connection is located.

Finally, it may be recalled that the additional bead 1e, which is in contact with the inner surface of the body in the region of the inlet 2a of the connector, facilitates guiding of the tube in the final phase of its fit and especially avoids, in cooperation with bush 7, the radial oscillations of the tube in the connector.

Dismantling of the connection is easily effected. As at least one of the bridges 4c–4d projects outwardly of the connector, particularly through opening 3c, it suffices to bring them radially closer to each other, either manually, or with the aid of an appropriate tool, to provoke an elastic deformation of the ring.

Thanks to the oblong shape of this latter, the diameter of its cylindrical central region is increased, thus releasing the abutment of the side 1c of the bead of the tube on the rear edges 4g–4h of the ring, which allows extraction of the tube from the connector in the direction of arrow F (FIG. 2).

It will be noted here that the articulated mechanical connection of the ends of the band constituting the ring, as shown in FIG. 7, facilitates deformation of the latter and will be particularly advantageous if the connection has a small diameter.

Although a connection has been described herebefore, in which the two ends of the oblong profile of the locking ring are shaped as a U-bridge, it should be emphasized again that only at least one of these ends must present this particular shape.

The variant embodiment shown in FIGS. 11 and 12 to which reference will now be made, is particularly applicable to connections of small diameter, such as the connections located on the fuel pipes of automobile vehicles.

FIG. 11 shows a structure similar to the one shown in FIGS. 1, 2 and 3. The elements already described bear the same references increased by 10.

Tube 11 presents only one bead 11a located at a distance d' from its free end 11b intended to be fitted in the connector 12. The latter is constituted by a body 13 whose rear pare 17, located to the right in the Figures, presents a well known, so-called "Christmas tree" or "olive" shape, on which a pipe of flexible material, rubber or plastics material, can be force-fitted and fixed by any appropriate means. Between its rear part 17 and its inlet 12a, the connector presents a shoulder which constitutes an annular housing for two O-rings 16 and 16'. This housing is closed by a force fitted or crimped washer 15. Beyond the housing of the O-rings, towards inlet 12a, the body of the connector presents another shoulder forming a second annular housing 13a which is closed by a crimped washer constituting the inlet 12a of the connector 12.

In the annular housing 13a is disposed an open locking ring 14 constituted by a thin, flexible, metal band, folded in the form of an oblong clip. The clip thus presents two substantially cylindrical, central portions 14a and 14b and, at its apex, an upturned U bridge 14c. Its two free ends 14d, 14'd are intended to be fastened to the wall of the housing 13a under conditions indicated hereinafter.

The annular housing 13a comprises at least one opening 13c, generally formed by a wide slot opening out towards the inlet end of the connector, which is axially closed by the washer 12a, after crimping thereof.

In a zone of the wall of the housing 13a, diametrally opposite the opening 13c, there are provided two substantially axial slots 13d and 13'd, likewise axially closed after the washer 12a has been crimped.

As clearly shown in the Figures, the bridge 14c is slidingly engaged in the opening 13c, while tabs located at the ends 14d and 14'd of the clip 14 are introduced into slots 13d and 13'd before being folded on the outer face of the wall of the housing 13a, which ensures fastening of the ends 14d and 14'd of the clip to said wall.

In the free state, the small diameter of the clip 14 is at the most equal to the diameter of the tube 11. Its central portions 14a and 14b advantageously define a slightly truncated form from the inlet 12a of the connector, with the result that their front edges are naturally widened with respect to their rear edges without it being necessary to provide particular arrangements to that end.

After assembly of the open ring 14 and crimping of the washer 12a, the connector 12 is ready to receive the tube 11 and to ensure locking thereof, under conditions similar to those described hereinabove with reference to FIGS. 1, 2 and 3. Dismantling of the connection is also effected in the manner already described, by radial deformation of the ring 14 under the effect of a pressure exerted on the bridge 14c.

The structure of the connection which has just been described, in one or the other of its variant embodiments, is capable of being easily equipped with complementary members or of receiving minor modifications in order to perform specific functions sometimes requested by the users.

For example, certain users desire a permanent indicator of the correct locking of the tube in the connector. The invention makes it possible to satisfy this requirement in one or the other of the variant embodiments already described.

FIGS. 8 and 9 are similar to FIGS. 2 and 3, but the connector that they show comprises a locking indicator clearly visible in FIG. 10.

The permanent locking indicator, designated by general reference 9, is constituted by a generally metal ring 9a, whose inner diameter is substantially equal to that of the tube 1 and whose outer diameter is at the most equal to the inner diameter of the housing 3a. The inner periphery of the ring extends axially by a sleeve 9b, while, on its outer periphery are disposed two tabs 9c and 9d extending axially in the same direction as the sleeve 9a. The two tabs 9c and 9d are diametrally opposite and their length $d_1$ will be defined hereinbelow.

As clearly shown in FIG. 8, the indicator 9 is disposed in the housing 3a, its sleeve 9b and the tabs 9c and 9d extending in the direction of the inlet 2a of the connector through the bridges 4c–4d of the ring 4.

Before tube 1 is fitted, the tabs 9c–9d, traversing the openings 3c–3d, thanks to their flexibility, are clearly visible outside the connector, beyond the bridges 4c–4d. Furthermore, the sleeve 9b is engaged in the central region of the ring 4. In this way, the movement of fit of the tube 1 up to the position shown in FIG. 8 encounters virtually no resistance other than that necessary for passing the O-ring 6.

The movement of fit continuing, the ramp 1c pushes the sleeve 9b of the indicator 9 which slides towards the right in FIG. 8 in housing 3a. Simultaneously, tabs 9c–9d slide beneath bridges 4c–4d. When the sleeve 9b has left the cylindrical portions of the ring 4, they abut on the ramp 1c and the tube is axially locked, in the manner described hereinabove, as soon as the rear edges 4g–4h of the ring can constitute an abutment for the radial slide 1d of the bead 1a of the tube. In this position, visible in FIG. 9, the flexible tabs 9c–9d of the indicator 9 are virtually totally concealed by the base of the bridges 4c–4d. It is the certain indication of correct locking of the tube in the connector. To that end, it suffices that the length $d_1$ of the tabs be close to the axial distance between the radial wall 5 and the inner face 3b of the housing 3a.

Similarly, referring again to FIGS. 11 and 12, a locking indicator 19 is shown, similar to the one which has just been described, but presenting only one flexible tab 19c mounted to slide beneath the single bridge 14c. This indicator may also present a second tab (not shown), diametrally opposite tab 19c.

Tab 19c retracts beneath bridge 14c during fit of tube 11 in connector 12 in a manner quite similar to that described hereinabove.

However, it will be noted that retraction of the locking indicators which have just been described is progressive, as it accompanies the movement of fit of the tube. Inversely, when the latter is extracted from the connector, the elasticity of the tabs of the indicator enables it to be returned towards the inlet of the connector, into a position, similar to that shown in FIG. 8, where each tab is clearly visible beyond the bridge of the locking ring. The shape of the openings made in the wall of the housing of the locking ring for the passage of the bridges is studied to facilitate abutment of the outer face of the tabs and, in this respect, the embodiment shown in FIG. 11 is advantageous.

Referring now to FIGS. 13 and 14, they show a variant embodiment in which the progressive locking indicator is made of plastics material. The elements already described and shown in FIGS. 11 and 12 bear the same references increased by 10 (possibly by 20 with respect to those of the elements of FIGS. 8 and 9). The connector 22 presents a structure similar to that shown in FIG. 11, its locking ring 24 being constituted, there again, by a clip with one bridge 24c.

However, it must be understood that this ring might be closed, with two diametrally opposite bridges, as has been described with reference to FIGS. 2 and 3.

The locking indicator 29 is constituted by a ring of plastics material mounted to slide in the housing 23a of ring 24, this locking indicator ring presenting, on its face opposite the inlet of the connector, a plurality of elastic blades 29f abutting on the annular bottom of the housing 23a. On its inner periphery, the ring 29 presents a plurality of catches 29g capable of coming into engagement solely with the ramp of the bead of the tube during fitting of the latter.

Finally, towards the inlet 22a of the connector, the ring 29 presents at least one axial tab 29c capable of sliding in an opening 22b made in the inlet washer 22a and possibly in the corresponding crimping of the connector.

Functioning of the locking indicator 29 is similar to that of indicators 9 and 19 described hereinbefore, the ring being pushed by the ramp of the tube (not shown) towards the bottom of the housing 23a against the action of the elastic blades 29f. However, it will be noted that the plastics material may easily be coloured so that, before it is progressively retracted in the housing 23a, the tab 29c is clearly visible outside the connector, as will be seen on examining FIG. 13. Another advantage of this embodiment is the total absence of aggressiveness of the free end of the tab 29c before locking of the tube. During dismantling of the connection, the elastic blades 29f push the ring 29 towards the inlet of the connector, rendering tab 29c visible again.

As has been indicated, positioning of the locking indicators 9, 19 or 29 is progressive. Now, certain users desire to have an indicator whose positioning is instantaneous and is accompanied, if possible, by a noise indicating locking.

Whilst conserving one or the other of the connector structures which have been described hereinbefore, the invention makes it possible easily to satisfy this particular requirement.

Referring now to FIGS. 15 and 16, a connector structure 32 is seen, similar to the one shown in FIG. 13, the elements already described being designated by the same references, increased by 10.

In housing 33a is slidingly mounted a notched washer 40 whose outer diameter is close to the diameter of the housing and whose inner diameter is substantially equal to that of the tube (not shown) but less than that of its locking bead. On an appropriate diameter, at least equal to that of the bead of the tube, certain notches of the washer are bent down to form axially extending tabs 40a.

Upon assembly of the connector 32, after positioning of the O-rings, the notched washer 40 is introduced in the housing 33a, the end of its tabs 40a being directed towards the inlet of the connector. The locking clip 34 is then disposed around the tabs 40a, while its bridge 34c is engaged in the opening provided to that end in the wall of the housing and the free ends of the clip are themselves fixed to the connector under conditions similar to those described hereinabove. The inlet washer 32a is finally crimped in order to constitute the inlet of the connector 32.

As is clearly shown in FIG. 16, the cylindrical portions 34a and 34b of the locking clip which rest on the outer face of certain tabs 40a, define, after assembly of the connector, an axial passage whose diameter is greater than that of the bead of the tube intended to be fitted in the connector. This results from the elastic radial deformation of the clip 34, which itself has for a consequence that its bridge 34c is flush on the outer wall of the housing 33a, as shown in solid lines in the Figures.

On the other hand, the inner periphery of the washer 40 constitutes an axial obstacle in the passage defined by the cylindrical portions 34a and 34b, the utility of which will appear in the following.

When the tube to be locked is introduced in the connector 32, its bead encounters no obstacle until its ramp attains the washer 40. The latter is then pushed during the continuing fit of the tube up to the position shown in broken lines in FIG. 15.

As the locking clip 34 is no longer maintained by the tabs 40a, it may then be abruptly applied on the wall of the tube and ensure locking thereof under the conditions which have been described hereinabove. Simultaneously, a metallic clicking noise may be perceived, while bridge 34c projects on the outer wall of housing 33a and occupies the position shown in broken lines in FIGS. 15 and 16. Such projection of the bridge constitutes the visible indicator of correct locking of the tube in the connector.

It has been indicated hereinabove that dismantling of the connection may be effected manually by deformation of the locking ring 4 (FIGS. 1, 2 and 3), 14 (FIGS. 11 and 12), 24 (FIGS. 13 and 14) or 34 (FIGS. 15 and 16). However, for certain applications, the users desire that dismantling be manually impossible and, on the contrary, it require the use of a specific tool.

The invention makes it possible easily to solve this particular problem and proposes, to that end, a first variant embodiment visible in FIGS. 17 and 18. The members already described are given the same references as those of FIGS. 1 to 7, but increased by 40.

Referring to FIGS. 17 and 18, it is seen that the lateral edges of an opening 43c made in the wall of the housing 43a each comprise a radial fold 43'c, preferably terminated by a winding at its free end. The operator who desires to dismantle the connection can thus no longer attain the bridge 44c with his fingers, but must, on the contrary, have available a tool, of the pliers type, whose jaws present a specific form adapted to penetrate between the folds 43'c. Increased safety of the connection which prevents any unauthorized dismantling, is thus obtained.

A second variant making it possible to obtain the same security is shown in FIG. 19, in which, again, the members already described are given the same references as those of FIGS. 1 to 7, but increased by 40.

As has already been indicated, the bridge 44c projects through the opening 43c made in the wall of the housing 43a, when the locking ring 44 ensures axial immobilization of the tube (not shown) in the connector.

However, it will be noted that at least one of the arms of the U forming the bridge 44c presents a fold 44'c located outside the housing 43a when the ring 44 is in locking position. As shown in FIG. 19, there preferably exists a fold 44'c on each of the arms of the bridge which thus constitute rough parts capable of abutting on the outer face of the wall of the housing 43a in the region of the opening 43c. Of course, these rough parts may be produced by any appropriate means, such as embossed portion or the like.

Again, a simple manual radial pressure on the bridge 44c is no longer sufficient to effect dismantling of the connection. On the contrary, it is necessary, thanks to an appropriate specific tool, to grip the arms of the bridge to eliminate the abutment of the rough parts on the edges of the opening 43c before being able to exert on the bridge the radial effort allowing dismantling of the connection.

It goes without saying that all the arrangements concerning the prevention of manual dismantling may be easily adapted by the man skilled in the art to the various variants of connector structure which have been described.

The embodiment shown in FIGS. 8 to 10 comprises a permanent locking indicator. The users sometimes desire a complementary indicator detachable from the connection after locking. This is particularly the case for the first assembly of the connection in mass production, in particular in the automobile industry.

Figure 21:
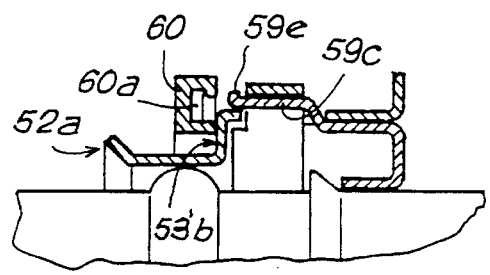

There again, the invention makes it possible easily to solve this particular problem and proposes to that end a variant embodiment visible in FIGS. 20, 21 and 22. The members already described are given the same references as those of FIGS. 1 to 10, but increased by 50.

Referring to FIGS. 20 to 22, it is seen that the free end of a tab 59c of the sliding permanent indicator 59 is provided with a radial fold 59e directed towards the outside of the connector. The complementary indicator 60 is constituted by a ring, preferably of plastics material, having a C-section, the outer arm of the C defining a groove 60a capable of receiving the radial fold 59e of the tab 59c and that of the lower tab (not shown). As shown in FIG. 22, the ring 60 preferably extends substantially over only three quarters of a circle.

During the movement of fit (already described with reference to FIGS. 8 and 9), the tabs of the permanent indicator 59 slide, towards the right in FIG. 19, beneath the corresponding bridges of the locking ring 54 thus driving the ring 60 towards the right. This latter movement of the ring 60 is, however, limited, the lower arm of its C-section abutting on the outer radial face 53'b of the housing 53a of the locking ring. Locking of tube 51 not yet being obtained, the operator continues the movement of the tube towards the right up to the position shown in FIG. 21 corresponding to complete locking.

The radial fold 59e of the tab 59c, as well as that of the lower tab (not shown), then leave the groove 60a of the ring 60 by elastic deformation of the tabs. The ring 60 therefore surrounds the inlet 62a of the connector and may, if desired, be withdrawn radially from the connector, by deforming it or even breaking it. Of course, the ring 60 may remain in place around the connector without problem, particularly if it extends over a complete circle.

If the connection has been dismantled, it will still be possible to verify complete locking of the tube after a fresh fit, thanks to the presence of the tabs of the permanent indicator 59 which retract virtually totally under the corresponding bridges.

It goes without saying that these latter arrangements concerning the detachable indicator may be adapted by the man skilled in the art to the various variants of connector structure which have been described.

What is claimed is:

1. A connector for connecting a free end of a rigid tube to a free end of a flexible hose, said connector comprising:

a) an annular bead integrally formed in the tube at a predetermined axial distance from the free end of the tube, said annular bead forming a radial shoulder opposite the free end; and b) a connection element attached to the free end of the flexible hose for receiving said annular bead of the tube, said connection element including:

(I) an inner bush engaging the inside of the hose, said inner bush forming a first annular housing;

(ii) an O-ring mounted in the first annular housing for contacting an outer surface of the tube between the free end and said annular bead, and means for retaining said O-ring in said first annular housing;

(iii) a sleeve affixed at one end on said inner bush, said sleeve including a second annular housing having at least one opening formed therein; and (iv) a thin metal band locking ring positioned in the second annular housing and presenting a generally oblong profile elastically deformable in a radial direction, said locking ring including a central region having substantially cylindrical portions whose diameter in the free state is no greater than the diameter of the tube, and at least one U-shaped bridge formed at a large diameter end of the oblong profile of said locking ring and projecting radially through the opening in the second annular housing of said sleeve whereby the central region of said locking ring engages the radial shoulder of said annular bead to secure the rigid tube to the flexible hose.

2. The connector of claim 1, wherein the locking ring is formed by a continuously closed metal band and presents a closed profile.

3. The connector of claim 2, wherein the locking ring comprises two U-shaped bridges and the second annular housing of said sleeve includes two corresponding openings, said bridge projecting radially outside said sleeve of the connector and disposed respectively at each of the ends of the large diameter of the ring.

4. The connector of claim 13, wherein the locking ring is formed by a metal band having two free ends which are immobilized with respect to an inner surface of the second annular housing of the connector.

5. The connector of claim 1, wherein an edge of the locking ring axially opposed to the hose is widened in the region of the cylindrical portions.

6. The connector of claim 1, including a slidably mounted permanent locking indicator ring whose inner diameter is no less than the outer diameter of the tube but no greater than the outer diameter of the radial shoulder on said annular bead such that said indicator ring is engaged by the bead when the bead is received by the connection element, said indicator ring presenting, on its outer periphery, at least one tab extending axially and engaged beneath the base of the U-shaped bridge of the locking ring through the opening in the second annular housing of said sleeve, the axial length of said tab being such that its free end is visible beyond the bridge when the tube is not locked in the connector but disappears when the tube is locked.

7. The connector of claim 6, wherein the indicator ring is provided with elastic means abutting on the connector to push the ring permanently towards the inlet of the connector, and including means for retaining said indicator ring in the second housing.

8. The connector of claim 6, wherein the ring of the locking indicator presents two tabs diametrically opposite each other, the free end of each tab comprising a radial fold.

9. The connector of claim 8, including a complementary locking indicator, said complementary indicator being detachable and likewise constituted by a C-shaped ring forming a groove for receiving the radial fold of the tabs.

10. The connector of claim 1, including a bearing washer disposed to the rear of the locking ring with respect to the inlet of the connector and slidably mounted in the connector between an unlocked position and a locked position, said washer presenting at least two diametrically opposite bearing zones for the cylindrical portions of the locking ring, the diameter separating said zones being at least equal to the diameter of the annular bead of the tube to be fitted in the connector, while the inner diameter of the washer is less than the diameter of said annular bead to provide an audible noise during locking of the connector.

11. The connector of claim 1, wherein each opening of said sleeve in the connector for the passage of each corresponding bridge of the locking ring presents lateral edges projecting radially to prevent deformation of the locking ring by manual engagement of the bridge.

12. The connector of claim 1, wherein at least one of the arms of the U-shaped bridge on said locking ring presents, in a zone projecting outwardly of the connector, a fold abutting, in the position of locking of the ring, on an outer face of the sleeve of the connector.

* * * * *